3,376,112
PRODUCTION OF CHLORINE THROUGH OXIDATION OF FILM OF FERRIC CHLORIDE SALT COMPLEX

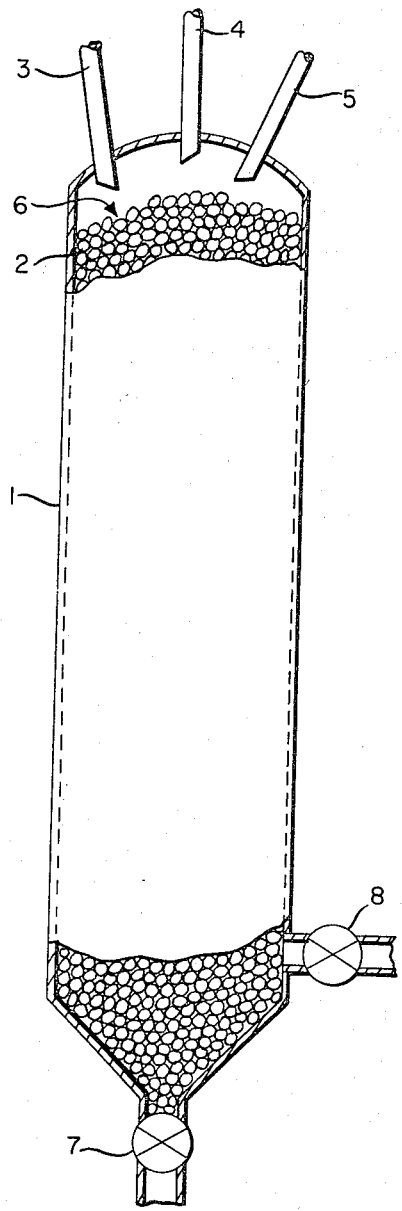
INVENTOR
WENDELL E. DUNN, JR.
JOHN F. MAURER
BY
ATTORNEY

Wendell E. Dunn, Jr., Newark, and John F. Maurer, Wilmington, Del., assignors to E. I. du Pont de Nemours and Company, Wilmington, Del., a corporation of Delaware
Filed Aug. 3, 1965, Ser. No. 476,826
14 Claims. (Cl. 23—219)

ABSTRACT OF THE DISCLOSURE

This process is directed to flowing a molten salt complex of the formula $XFeCl_4$ where X is an alkali metal as a thin film over a moving bed of particulate inert material cocurrently with an oxygen-containing gas, and recovering chlorine as a product.

---

This invention relates to chlorine manufacture and to novel methods for obtaining that element in relatively pure, high yields. More particularly, the invention relates to improved, more efficient and economical techniques for chlorine manufacture adaptable for commercial operation, the process being ferric chloride oxidation in which the following reaction is involved:

$$1\frac{1}{2}O_2 + 2FeCl_3 \rightarrow 3Cl_2 + Fe_2O_3$$

Prior attempts at developing an economical and commercial process for oxidizing ferric chloride in the above manner have not proved economically feasible. Thus, it has been proposed to conduct such reaction in the gaseous phase but the temperatures at which an adequate reaction rate is obtained prove to be too high for practical operation, since the equilibrium of the reaction becomes increasingly unfavorable for chlorine recovery. Again, it has been proposed (U.S. 1,435,928) to operate the oxidation process at lower temperatures with utilization of a salt melt to form a salt complex or eutectic with the iron compound; or by conducting the oxidation under a pressure sufficient to effect liquifaction of the ferric chloride (U.S. 1,992,685). However, these prior methods require use of complicated apparatus and the exercise of very careful controls over the operating conditions; and difficulties are encountered in removal of by-product iron oxide from the reactor and in sticking of the particulate bed material when this has been employed.

It has now been found that, pursuant to this invention, the above and other disadvantages characterizing prior oxidation methods for producing elemental chlorine can be effectively overcome. A salient object of this invention, therefore, is to provide novel and improved methods of operations and techniques under which the rate-limiting step of the ferric chloride oxidation reaction is effectively minimized. It is among the further objects of this invention to provide an improved, commercially adaptable process which can be continuously operated under a wide latitude of controlled, uniform operating conditions to insure recovery of high, increased yields of chlorine in a desired state of purity. Other objects and advantages of the invention will be apparent from the ensuing description. The accompanying drawing is diagrammatically illustrative of one form of apparatus in which the invention can be carried out.

In accordance with this invention, an oxygen-containing gas (oxygen or air) is reacted with ferric chloride complexed with NaCl, which salt complex results from the dissolution or condensation of the ferric chloride in the alkali metal salt. For purposes of this invention, the term "molten salt complex" is intended to mean a liquid composed of $FeCl_3$ and NaCl in proportions to give $NaFeCl_4$, which may contain, in addition, a dissolved excess of either NaCl or $FeCl_3$. The reaction is carried out in a closed reaction vessel at temperatures ranging from 400–750° C., preferably from 500–650° C., under controlled, anhydrous conditions. To achieve a successful operation having reaction rates and chlorine yields such as to render the process economically valuable, the oxidizing gas and either molten salt complex, or ferric chloride and sodium chloride which will form such molten complex at the temperature at which the reactor is operated, are charged over a bed of inert particles within the reactor, while cocurrent to the flow of these reactants, there is maintained a flow of oxidizing gas at a sufficiently high velocity to spread the molten salt over the surfaces of the bed in a thin film or coating. The molten salt complex derived from the dissolution or condensation of $FeCl_3$ in molten NaCl reacts with oxygen under the conditions of this invention according to the following reaction:

$$1\frac{1}{2}O_2 + 2NaFeCl_4 \rightarrow Fe_2O_3 + 2NaCl + 3Cl_2$$

Although the ferric chloride reactant is herein sometimes indicated by the chemical formula $FeCl_3$, it will be recognized that at temperatures below, say 450° C. the vapor will be almost completely in the dimer form, $Fe_2Cl_6$, while at higher temperatures the equilibrium shifts so as to increase the amount of ferric chloride which is in the form of the monomer, $FeCl_3$. Where $FeCl_3$ is the formula given, this is to be interpreted as the empirical formula, not the molecular formula.

Referring to the accompanying drawing, there is shown a conventional type reaction vessel 1 composed of or lined with a corrosion resistant metal, alloy or refractory material (silica, fireclay, porcelain, etc.) adapted to render said vessel inert toward reactants and reaction products at the temperatures of operation. Within the reactor a fixed or slowly moving bed 2 is provided made up of inert particles of iron oxide, glass beads, flint pebbles, porcelain balls, silica chips, alumina chips or the like, said particles being preferably in the size range of from about $\frac{1}{16}$ to $\frac{3}{16}$ inch diameter to provide surface area. If desired, such bed particles can be precoated with iron oxide. Feed inlets 3, 4, and 5 are provided at the top of the reactor for the introduction of bed particles, oxidizing gas, and molten salt complex (or the component alkali metal salt and ferric chloride). It may be desirable at times to introduce all or a portion of the oxidizing gas through the same inlet as is used for molten salt complex or its components; or it may be desirable at times to introduce a portion of the oxidizing gas through the same inlet as is used for the feed of bed material. An outlet 7 is provided in the bottom of the reactor through which ferric oxide- and alkali-metal chloride-containing bed particles can be withdrawn from the reactor and recycled, if desired, to one of the reactor inlets after treatment in an associated scrubbing or cleaning unit (not shown) to remove their ferric oxide and alkali metal chloride coating. A separate, valve-controlled outlet 8 is also provided at or near the bottom of the reactor through which product chlorine and excess gases from the oxidation can be withdrawn for passage to a suitable separating or treating unit (not shown) for separation, purification and recovery of the desired chlorine product. If desired, it would be possible, of course, to withdraw both bed material and exhaust gases through one outlet and effect gas and particulate separation outside the reactor vessel.

In oxidizing the molten-salt complex, for example, in the described apparatus, the desired amount of inert, particulate bed material can be charged into the reactor 1 through one of the inlets 3, 4, or 5 to form the contact bed 2. The reactor and its bed charge are then raised to a temperature of from 400–750° C., and preferably from 500–650° C., either through external heating by associated furnacing or electrical means, or by recourse to internal heating by passing hot air or combustion gases therethrough, or by burning of fuel within the recator, or by preheating the pebbles in a separate furnacing section. Upon attaining the desired reactor and bed temperature, the molten-salt complex can be charged to the reactor for reaction through the feed inlets and passed downwardly over the surfaces of the bed particles 2, while air or oxygen is cocurrently charged at a controlled rate into the reactor through one or more of the inlets. To achieve reaction rates which render the process economically valuable, the film of liquid chloride-containing reactant is spread over the surfaces of the bed particles. This is accomplished by cocurrently flowing the oxygen-containing gas at a high, independently controlled velocity through the reactor with the chloride-containing reactant and over said bed particles. For convenience, gas flow rate utilizable in the invention can be expressed as G and defined as pounds of said oxygen-containing gas fed to the reactor per hour per square foot of the reactor cross-sectional area. As the reaction proceeds, the value of G at downstream points in the reactor will be found to vary. Hence the definition of G is in terms of pounds of gas fed to the reactor under any specific condition of operation. Under the limiting conditions for this invention the values of G can range from 10 to 10,000 and preferably range from between 75 and 325. The oxidizing gas reactant is charged at such velocity that it aids the reactant molten-salt complex to spread over and be maintained in the form of a relatively thin film or coating on the surfaces of the bed particles.

Where large liquid flows are used, the gas mass flow rate is more effective in raising the reaction rate. Where only a small amount of liquid is present, i.e., where NaCl is fed separately, at, say, ½₀ mole per mole $FeCl_3$, a lower mass flow rate is able to maintain a thin layer on the bed particles. The oxidation reaction causes formation of deposits 6 consisting of ferric oxide and sodium chloride on the bed particles and a consequent slight increase in their size.

In a preferred method of operation, portions of the bed are continuously withdrawn and recycled. During this step the $Fe_2O_3$ and NaCl can be abraded. This provides for the removal of $Fe_2O_3$, a product of the reaction. Generally this $Fe_2O_3$-NaCl coating falls away from the bed particles incident to the recycling, if air conveying is employed. Periodically as desired, portions of the removed bed particles may be replaced by new particles. Excess gases and product chlorine evolved in the reaction are withdrawn from the reactor through outlet 8 for passage to associated conventional type collection, separation, purification and recovery equipment.

To a clearer understanding of the invention, the following specific examples are given. These are merely illustrative and are not to be construed as in limitation of the invention.

Example I

A stainless steel reactor 9 feet in length and 1 inch in diameter, such as the type shown in the accompanying drawing, was filled with glass beads of about ⅛" diameter as a contact bed. The temperature of the reactor and bed particles was raised to 500° C. by the application of external heat, and a feed of liquid $NaFeCl_4$ salt-complex at a temperature of 200° C. was pumped into the top of the reactor at the rate of 10 grams per minute. The molten salt complex, on introduction into the reactor, was spread over the surfaces of the bed of glass beads and blown downwardly toward the bottom of the reactor in the form of a thin film by a flow of oxygen while the temperature within the reactor was held at 500° C. The rate of oxygen flow was $G=23$. As a result, reaction took place between the oxygen and molten salt complex and as the reaction proceeded, the bed mass of beads became covered with NaCl and $Fe_2O_3$ which formed thereon as an adhering, solid coating. The gases evolved in the reaction were withdrawn for collection through an outlet in the bottom of the reactor and were subsequently tested. On analysis, their composition was found to be 92% chlorine and 8% oxygen, and represented a 90% chlorine yield based on the $NaFeCl_4$ fed to the reactor. The $Fe_2O_3$ and NaCl-coated beads were withdrawn and subjected to a light grinding treatment in a conventional ball mill to remove the coating. The cleaned beads were recirculated to the top inlet of the reactor for reuse in the system.

Example II

A stainless steel reactor 8 inches in diameter by 15 feet in height of the configuration shown in the drawing was charged from the top of the reactor with pellets of alumina of ⅛" diameter to form a contact bed. The temperature of the charged reactor was raised to 550° C. and a feed of liquid $NaFeCl_4$ at 240° C. was fed into the top of the reactor at the rate of 1.88 lbs./min. Oxygen at a temperature of 550° C. was fed from the top of the reactor at the rate of $G=89.7$ in cocurrent flow with the liquid $NaFeCl_4$ reactant, causing a thin film of liquid to be formed on the bed particles. Coated alumina bed particles, the coating having formed as a result of the reaction, were removed from the bottom of the reactor at the rate of 15 lbs./min. A pressure drop across the reactor of 25 inches of water was measured.

The reaction was conducted under the foregoing conditions for a period of one hour and 35 minutes during which time the gases evolved from the reaction were withdrawn and run through a caustic scrubber. Analysis showed a chlorine production rate of 0.94 lbs./min. and a total chlorine yield of 94.5% based on the $NaFeCl_4$ fed to the reactor.

The $Fe_2O_3$ and NaCl coating which built up on the alumina bed particles in their passage through the reactor, was easily removed from the withdrawn particles during the course of their air transport to the top of the reactor for recycle. Analysis of the $Fe_2O_3$ and NaCl deposit recovered from the removed particles showed a chlorine yield of 99% based on the $NaFeCl_4$ charge. (The discrepancy between the yield results, as calculated from the gases absorbed in the scrubber, and iron oxide deposited on the bed particles, was found to be due to slight leaks in the reactor and some inefficiency in the caustic scrubber system.)

Example III

This example will illustrate the operation of this invention using dry feed material comprising $FeCl_3$ obtained as a by-product of chlorination of ilmenite, admixed with NaCl. Employing the same reactor as in the previous example, but with a feed of $FeCl_3$ and NaCl in about ½₀ equimolar amount, the $FeCl_3$ containing also typical ilmenite-chlorination impurities such as $MnCl_2$, $MgCl_2$, and $TiCl_4$, chlorine was produced with 93% recovery. Over a period of 12 hours, $FeCl_3$ was fed at a rate of 1.2 lbs./min. along the NaCl. Bed material was recirculated at the rate of 15 lbs./minute, and $Fe_2O_3$ as fines was separated from the bed material removed from the reactor. $Fe_2O_3$ also built up on the alumina beads within the reactor, and was found to come to an equilibrium concentration at 4.8% iron. G in this example was equal to 72, based on oxygen input.

Temperatures along the reaction column were held at 600° C. by adjustment of electrical input. Gas samples collected at the exit, showed a composition of chlorine 44.4%, $O_2$ 28.6%, $N_2$ 23.9% and $CO_2$ 3.1%. The $CO_2$ represents coke, which was fed as an impurity in the $FeCl_3$, and which oxidized to the extent of about 7%. In order to maintain heat balance, electrical inputs were reduced reflecting the heat release resulting from the oxidation of the carbon.

In this experimental example of the operation of this invention, the effective length of the column, that is, the length through which reaction was actually taking place, was about 12 feet. Substantially complete oxidation of ferric chloride which was fed was obtained by use of an excess of oxygen and an FeCl₃ feed proportioned to the reactor volume. In plant operation, a column longer than this would be used, and therefore the concentration of chlorine in the exit gas would be appreciably greater than 44%. The ferric chloride feed rate could be increased concomitant with the increase in length of reactor column.

During 12 hour duration of this run, chlorine recovery was found to be 93%, and iron recovery was found to be 90%.

Example IV

In a 30 mm. diameter reactor, a 29 cc. bed of ⅛" $Fe_2O_3$ beads was held at 550° C. during a reaction in which varying amounts of NaCl and gaseous feed of FeCl₃ were reacted with 10% excess $O_2$. The rate of chlorine production with varying amounts of salt is given in the table below. The weights given for NaCl are in grams, the total weight of the bed being 70 grams. Excess FeCl₃ was collected in a condenser below the 29 cc. reaction zone.

| NaCl | Lbs. Cl₂ produced per hr. per cubic ft. |
|---|---|
| 0 | 17.5 |
| 0.1 | 100 |
| 0.25 | 120 |
| 0.375 | 140 |
| 0.50 | 150 |
| 1.00 | 180 |
| Floods [1] | 40 |

[1] Liquid NaFeCl₄ feed, G (gas flow rate)=150.

It will be evident from the above examples that the invention advantageously affords an economical and convenient oxidation reaction for obtaining chlorine in excellent yields. In the process a reactant comprising FeCl₃ and NaCl is exposed for reaction with an oxidizing gas, preferably oxygen or oxygen-enriched air, while in a very thin layer or film over the surfaces of $Fe_2O_3$ or other inert bed particles maintained in a reactor under temperatures ranging from 400–750° C.

Although the molten salt complex NaFeCl₄ comprises a preferred form of reactant, the invention is not restricted thereto since use is contemplated of other alkali metal chlorides in accordance with the following equation:

$$3O_2 + 4XFeCl_4 \rightarrow 2Fe_2O_3 + 4XCl + 6Cl_2$$

wherein X is an alkali metal (sodium, potassium, lithium, etc.) with the alkali metal chloride content of the iron-salt complex being present in a range of from 0.00 to 1.3 mols per mol of FeCl₃. The concentration of FeCl₃ in the molten feed is not a critical factor and the complex can be prepared by simply bringing gaseous FeCl₃ in contact with the alkali metal chloride. Solid FeCl₃ can be used as feed provided sufficient heat is available within the reactor to effect vaporization of the solid FeCl₃. NaFeCl₄ as a liquid feed material has been found advantageous because the vapor pressure of this salt complex is relatively low and the material is more easily handled than

FeCl₃·NaFeCl₄

The process has also been operated employing FeCl₃ vapor flowing over a NaCl-containing bed with good reaction rates being obtained. Also, operation may be effected using liquid FeCl₃ fed to the reactor separately from the alkali-metal salt.

The reaction can be carried out in a fixed bed of inert particles, but preferably is effected while said bed particles move slowly through the reactor. By use of a reactor with a slowly moving bed of particles upon which a thin film of the reactant salt complex is spread by means of cocurrent rapid flow of the oxidizing gas, oxidation of ferric chloride in high yield is readily attained, particularly within the preferred temperature range of about 500 to 650° C. Under these conditions, the heat balance is exothermic, and the rate of reaction adequate to permit use of a reactor of a convenient size. The wetting tendency of the molten salt complex relative to ferric oxide, and the shear stress of the cocurrently moving gas will provide a sufficiently thin layer of liquid on the surface of the bed particles to assure that the desired reaction will proceed at a good velocity.

The temperature range within which the process is economically operable has been indicated as ranging from 400 to 750° C. with a preferred operating range of 500 to 650° C. In order to maintain a favorable heat balance in the reactor, it may be desirable under certain conditions to add to the reactor small amounts of fuel materials. In general, any element whose oxide is more stable than its chloride could be added as a fuel material. In the instance of carbon use, the carbon chosen must burn readily and completely at the temperature of operation of the process. Carbon-containing fuel materials such as CCl₄, CO, COCl₂ or hydrocarbons can be used as desired. The heat balance may also be maintained by controlling the inlet temperature of reactants and recycled bed.

It has been found preferable to carry out the invention while maintaining the pressure within the reactor slightly above atmospheric to prevent gas leakage into the bed. If desired, the invention can be carried out at exit pressures ranging from about 0.5 to 7 atmospheres.

As has been indicated the reactor employed in the invention can be constructed of stainless steel, Inconel, or silica and may be brick lined; or it can be composed of any other material which is inert or resistant to the reactants and products at the temperatures of operation. Due to its chemical resistivity and physical strength, Inconel is preferred as a metallic material of construction.

The inert particles employed as a surface upon which the reaction takes place and on which there are deposited ferric oxide and alkali-metal chloride, can vary in size from 1/16" to ½" but preferably have a diameter of about ⅛". The size of particles employed should provide maximum surface within the reactor consistent with acceptable pressure drop. Since the preferred method of operation entails the use of a bed flowing at a slow rate toward the bottom of the reactor with continual removal of bed particles, desirably the particles when fed to the reactor should be small. However, if the particles are too small, excessive pressure drop and undesired agglomeration of particles may occur. Hence bed particles in the size ranges above mentioned are recommended for use in the invention.

The rate of removal of coated bed particles from the reactor is dependent on several variables, among which are (1) the amount of Fe₂O₃ build-up possible without agglomeration, (2) heat balance considerations, and (3) particle attrition during transport. In general, the weight ratio of bed particles fed to iron oxide product removed from the reactor can vary from about 3 to 1 to 30 to 1. Preferably this weight ratio ranges from 5 to 1 to 15 to 1.

Although under most circumstances it will prove convenient to have the bed of inert particles moving cocurrent with the flow of the oxidizing gas and molten reactants, the reactants may flow upward countercurrent to the passage of the bed if desired. It is, however, a necessary condition of operation in the invention that the flow of oxidizing gas through the reactor be cocurrent with the flow of the FeCl₃-NaCl reactant. As already indicated the process may be carried out utilizing a fixed bed of inert particles, but the preferred operation is to have the bed of inert particles which become covered with byproduct Fe₂O₃ and NaCl, move through the reactor, either cocurrent with or countercurrent to the reactants, and to remove the coated inert particles from the reactor either continuously or intermittently. The coated particles may then be treated to remove said by-products either by grinding, shaking on a screen, leaching or by any other suitable means; and the cleaned or partially cleaned particles recycled to the reactor for reuse therein, or discarded, as desired. The rate of travel of the moving bed can vary and is dependent upon the recycle ratio, but preferably is in the range from 1.0 to 100.0 ft./hr. as determined by the quantity of cooled bed particles withdrawn from the reactor.

It will be found convenient in the operation of the invention to introduce the reactant $NaFeCl_4$ while in liquid state. Alternatively, however, a plurality of reactant-feed inlets may be provided whereby the NaCl can be fed as a solid and the $FeCl_3$ fed as solid, liquid, or gas, either separately from or together with the NaCl. A convenient method of feeding the reactants is to transport the molten salt complex into the reactor by means of the flow of the oxygen-containing gas.

Although directed chiefly to the oxidation of $FeCl_3$ in accordance with the foregoing equations, $FeCl_2$ may be present in the feed material in relatively large amounts but will be converted almost immediately in the presence of chlorine $FeCl_3$. Small amounts of other chlorides, such as, for example, $MnCl_2$ or $CrCl_3$ may also be present as impurities.

We claim:

1. A process for producing chlorine through oxidation of ferric chloride, which comprises flowing the said chloride in the form of a molten-salt complex of the formula $XFeCL_4$ wherein X represents an alkali metal in a reaction vessel maintained at a temperature ranging from 400–750° C. as a thin film over the surfaces of a bed of particulate, inert material; coflowing an oxygen-containing gas with the said salt complex while maintaining said gas under a flow rate in pounds of oxygen-containing gas fed to the reactor per hour per square foot of the reactor cross-sectional area of 10–10,000; and recovering the gaseous and solid products derived from the reaction thus effected.

2. The process of claim 1 wherein the said molten-salt complex per se is added to the reaction vessel.

3. The process of claim 2 wherein the said temperature is maintained from 500 to 600° C. and the said flow rate of oxygen-containing gas is from 75 to 500.

4. The process of claim 2 wherein the said oxygen-containing gas is added in an amount at least stoichiometric to form $Fe_2O_3$ with the ferric chloride in said molten salt-ferric chloride reactant.

5. The process of claim 1 wherein the said bed of particulate, inert material moves countercurrently to the said oxygen-containing gas.

6. The process of claim 1 wherein X is sodium.

7. The process of claim 6 wherein the said temperature is maintained from 500 to 650° C. and the said flow rate of oxygen-containing gas is from 75 to 325.

8. The process of claim 1 wherein the said molten-salt complex is formed from a feed of solid sodium chloride and solid ferric chloride in molar ratios of from 0.002:1 to 1.3:1.

9. The process of claim 1 wherein the said molten-salt complex is formed from a feed of solid sodium chloride and gaseous ferric chloride in molar ratios of from 0.002:1 to 1.3:1.

10. The process of claim 1 wherein the said molten-salt complex is formed from a feed of solid sodium chloride and liquid ferric chloride in molar ratios of from 0.002:1 to 1.3:1.

11. The process of claim 1 in which the pressure within the reactor is maintained at from 1 atmosphere to 7 atmospheres.

12. The process of claim 8 in which the pressure within the reactor is maintained at from 1 atmosphere to 7 atmospheres.

13. The process of claim 1 in which there is present in addition to the reactants named therein, a material which burns as a fuel during said process.

14. The process of claim 8 in which there is present in addition to the reactants named therein, a material which burns as a fuel during said process.

References Cited

UNITED STATES PATENTS

| | | | |
|---|---|---|---|
| 2,206,399 | 7/1940 | Grosvenor et al. | 23—219 |
| 2,418,931 | 4/1947 | Gorin | 23—219 |
| 2,448,255 | 8/1948 | De Benedictis et al. | 23—219 X |
| 2,547,928 | 4/1951 | Davis et al. | 21—219 |

OSCAR R. VERTIZ, *Primary Examiner.*

EDWARD STERN, *Examiner.*